April 24, 1934.  E. B. MALOON  1,955,925
TRACTOR AND AUXILIARY APPARATUS
Filed May 20, 1931  2 Sheets-Sheet 1

INVENTOR.
Earl B. Maloon.
BY Lounsbury, Loftus & ahett
ATTORNEYS.

April 24, 1934.   E. B. MALOON   1,955,925
TRACTOR AND AUXILIARY APPARATUS
Filed May 20, 1931   2 Sheets-Sheet 2
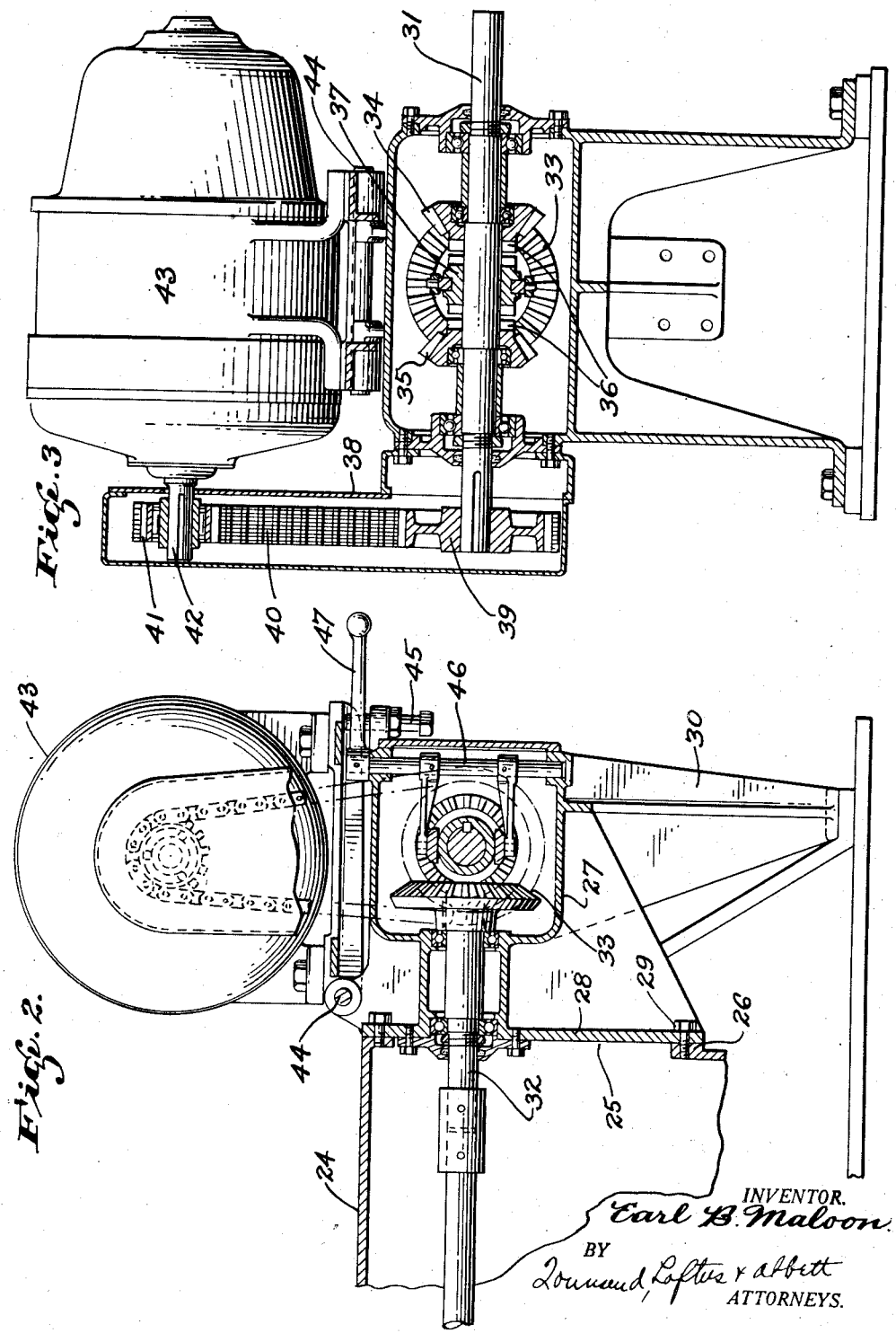
INVENTOR.
Earl B. Maloon
BY
Townsend, Loftus & Abbett
ATTORNEYS.

Patented Apr. 24, 1934

1,955,925

UNITED STATES PATENT OFFICE 1,955,925

TRACTOR AND AUXILIARY APPARATUS

Earl B. Maloon, Oakland, Calif., assignor, by direct and mesne assignments, to Pacific Tractor Equipment Inc., Oakland, Calif., a corporation of California Application May 20, 1931, Serial No. 538,764

1 Claim. (Cl. 74—7)

This invention in general relates to tractors and auxiliary apparatus drawn thereby.

It is the principal object of the present invention to provide a tractor equipped with a generator driven from the power plant of the tractor and capable of delivering electrical energy to electric motor operated auxiliary equipment drawn by the tractor.

In carrying the invention into practice I fit the tractor with a generator unit driven from the power take-off shaft of the tractor. The auxiliary apparatus drawn by the tractor is operated by an electric motor to which current is supplied from the generator on the tractor. The electrical energy generated may also be distributed to other electrically operated apparatus as desired as the tractor may be used as a portable generating plant.

One form which the invention may assume is exemplified in the following description and illustrated by way of example in the accompanying drawings, in which:

Fig. 2 is an enlarged view of the preferred form of generator unit with parts in section to more fully disclose certain features of construction.

Fig. 3 is a side elevation of the generating unit disclosed in the preceding figure, partly in section.

Figure 1:
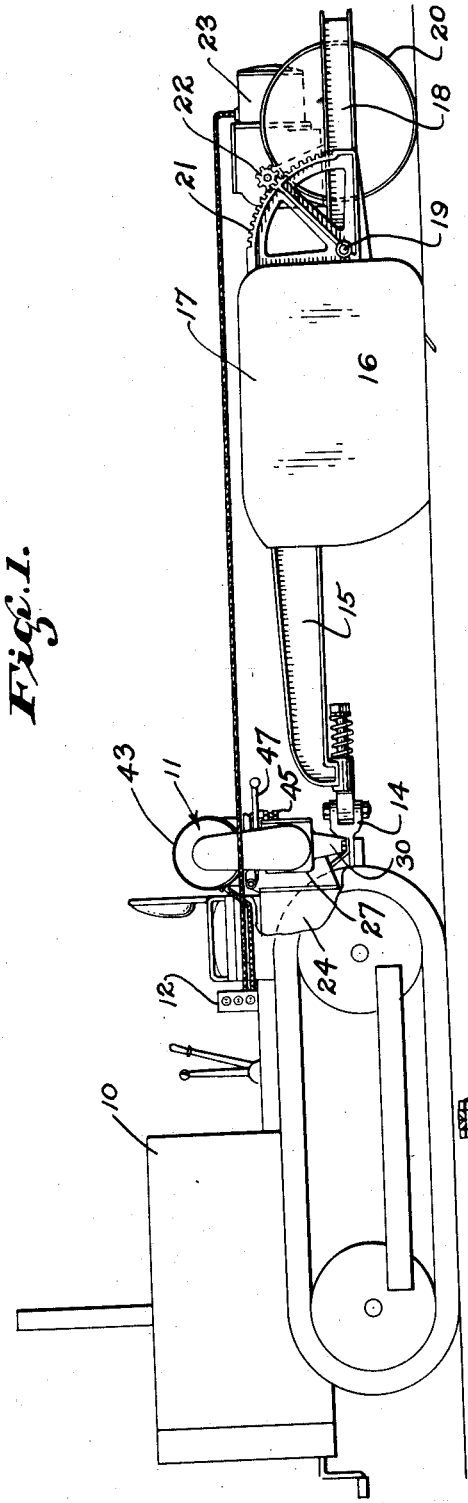
Fig. 1 is a view of the general assembly of tractor and auxiliary apparatus electrically equipped in accordance with my invention.

Referring more particularly to the accompanying drawings, 10 indicates a tractor of a standard type having a differential housing which is designed to receive a power take-off unit such as indicated at 11. The tractor 10 is equipped with a power take-off shaft which may be easily connected with such unit 11 in order that the power plant of the tractor may be utilized to drive the unit 11.

In this instance the power take-off unit consists of a generator for generating electrical current which may be applied to various uses, for example, the operation of a motor operated auxiliary equipment drawn by the tractor such as scrapers and like apparatus. Also, the generator unit 11 may be electrically connected to a distribution box such as illustrated at 12 so that the current generated may be led to apparatus not connected with the tractor such as electric drills, motor driven pumps or other apparatus utilized in road building or in other construction work or in agricultural districts where electric power is not readily available.

In the present instance the tractor 10 is shown as being provided with a drawbar hitch 14 connected to the drawbar 15 of a scraper 16. This scraper is of a type illustrated, described and claimed in my copending application entitled "Scraper", filed May 20, 1931, Ser. No. 538,763.

The scraper illustrated includes a scraper bowl 17 to which a frame 18 is pivotally connected at its forward end as at 19. This frame carries one or more rollers 20 so that by vertically adjusting the position of the frame 18 the scraper bowl 17 is either elevated or lowered with respect to the surface engaged by the wheels 20.

For adjusting the frame 18 vertically a segment 21 is relatively fixed to the scraper bowl 17 and is engaged by a pinion 22 driven from an electric motor 23 carried by the frame 18 so that when the motor 23 is placed in operation the vertical position of the rearmost end of the frame 18 will be changed relative to the scraper bowl 17 to effect vertical adjustment of the latter. The motor 23 on the scraper is preferably of the reversible type so that it will operate in either direction and may be fully controlled from the tractor 10.

The tractor 10, as previously described, is fitted with a suitable pad on its differential housing so that the generator assembly 11 may be bolted firmly to the frame of the tractor. In the present instance I have shown two forms of generator units for use in connection with the tractor. The preferred form is that illustrated in Figs. 2 and 3 of the drawings. Reference being had to these figures the numeral 24 indicates a portion of the differential housing of the tractor which is formed with an opening 25 surrounded by a pad 26. The generator unit is fitted with a casing 27 having a plate 28 adapted to bear against the pad 26 and be bolted thereto by means of cap screws or studs 29. The housing 27 is also formed with brace members 30 so designed as to engage and be secured to the drawbar hitch of the tractor.

The housing or casing 27 encloses a countershaft 31 which extends transversely relative to the tractor. The housing 27 also supports a driven shaft 32 which is adapted to project forwardly within the differential housing of the tractor and engage the power take-off shaft of the tractor so that the energy necessary to drive the generator may be derived directly from the power plant of the tractor.

The rearmost end of the driven shaft 32 which projects within the housing 27 is fitted with a bevel gear 33 in mesh with two bevel gears 34 and 35 on the countershaft 31. These bevel gears 34 and 35 are collared against axial movement on the shaft 31 but are normally free to rotate thereon. The adjacent faces of these two gears are formed with clutch faces 36. Feathered on the shaft 31 intermediate the gears 34 and 35 is a clutch member 37 which is capable of being shifted axially on the countershaft 31 so as to connect either gear 34 or 35 to the countershaft so that the latter will be driven from the driven shaft 32 through the medium of the bevel gear 33.

At one end the shaft 31 projects from the housing or casing 27 so that a pulley or other driving element may be secured thereon to transmit a drive to any desired auxiliary apparatus not shown; that is, the shaft may be operatively connected with a water pump or any other mechanism desired for driving the same so that when the tractor remains stationary its power plant may be utilized to drive such auxiliary apparatus.

The opposite end of the shaft 31 projects within a separate casing 38 suitably secured to the housing 27. This end of the shaft 31 is fitted with a sprocket 39 engaging an endless chain 40 which also engages a sprocket 41 mounted on the shaft 42 of an electric generator 43 of any preferred and suitable design. The frame of this generator 43 is pivoted as at 44 to the top of the housing 27. The axis about which the frame pivots is parallel to the axis of the generator shaft. At the other side of the frame of the generator, the latter engages a set screw 45 projecting upwardly through an overhanging portion of the housing 27. In this manner the generator through the medium of its frame may be swung slightly about its pivotal point 44 to maintain a desired tension on the endless chain 40 by means of which it is driven.

The sprocket 41 on the generator shaft 42 is drivenly connected to the latter through the medium of a one-way clutch so that when the shaft 31 is driven in one direction a drive will be transmitted to the generator through the medium of the sprockets 39 and 41 and the chain 40. Of course, when the shaft 31 is driven in the opposite direction the one-way clutch connecting the sprocket 41 to the generator shaft is ineffective to transmit this drive to the generator.

It will be seen that the clutch collar 37 is operated through the medium of a shifting fork assembly 46 equipped with an operating handle 47 which projects rearwardly from the casing 27. By oscillating this handle either bevel gear 34 or 35 may be connected with the shaft 31 to impart a drive thereto. When the proper gear 34 or 35 is clutched to the shaft 31, the generator will be driven in a direction causing it to generate current for distribution. When the opposite gear, however, is engaged, the shaft 31 will be driven in a reverse direction and as previously described this drive will not be transmitted to the generator due to the provision of the one-way clutch between the pinion 41 and the generator shaft 42. However, through the medium of the clutch mechanism described, the shaft 31 may be driven in either direction to enable it to be of considerable utility in driving auxiliary apparatus as previously described.

Figure 4:
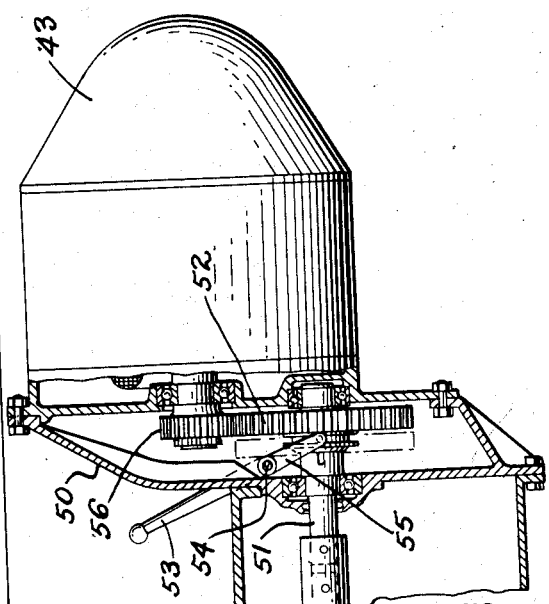
Fig. 4 is a view of a modified form of generator unit.

In Fig. 4 I have shown a slightly modified form of the generator assembly. In this form the generator frame is provided with a housing 50 suitably secured by bolts or other devices to the differential housing of the tractor, with the axis of the generator substantially parallel to the longitudinal axis of the tractor. The housing 50 supports one end of a driven shaft 51 which is connected as previously described to the power take-off shaft of the tractor. Reciprocably mounted on this shaft 51 within the housing 50 is a spur gear 52 which may be shifted along the shaft 51 through the medium of a shift lever 53 arranged exteriorly of the housing 50 and connected to the gear 52 through the medium of a shift shaft 54 and a shifting fork 55. The gear 52 is adapted to be placed into and out of mesh with a pinion 56 on the shaft of the generator. When the gear 52 is in mesh with the pinion 56 and the power plant of the tractor is in operation, the generator will be driven to generate current for distribution. However, if the gear 52 is out of mesh with the pinion 56, the generator will remain idle regardless of whether or not the tractor power plant is in operation.

In operation of the device, a suitable generator set is constructed in accordance with the teachings herein and mounted on the tractor. If it is desired to operate the generator, a driving connection between the generator and the power take-off shaft of the tractor is established. Current generated is led to the distribution box 12 and from there may be directed to a proper auxiliary vehicle drawn by the tractor such as the scraper illustrated, which connection, however, will be suitably controlled through the medium of switches placed within convenient reach of the operator of the tractor. In this manner the tractor operator will have full control over the operation of the auxiliary equipment drawn by the tractor.

The distribution box 12, as previously mentioned, may carry any desired number of plug receptacles to which apparatus such as portable electric drills or other electrically driven equipment may be connected so that they may be operated by the current generated on the tractor.

When the form of the generator assembly is such as illustrated in Figs. 2 and 3, the clutch 37 may be manipulated, as previously described, to operate the shaft 31 in either direction. When it is operated in one direction, the generator 43, of course, will be placed into operation but likewise the shaft 31 will be driven so that a mechanical drive may be transmitted to such auxiliary apparatus as desired. The shaft 31 may also be driven in the opposite direction if necessary or desirable by reason of the projecting portion of the shaft 31.

From the foregoing it is obvious that I have provided an improved apparatus for electrically driving auxiliary equipment drawn by a tractor and also created a source of electrical energy for use in operating various electrically driven or operated equipment in remote places where electrical energy is not readily available.

While I have shown the preferred form of my invention, it is to be understood that various changes may be made in its construction by those skilled in the art without departing from the spirit of the invention, as defined in the appended claim.

Having thus described my invention, what I claim and desire to secure by Letters Patent is:

A generating unit for a tractor having the usual differential housing and power take-off shaft, said generating unit including a frame mounted on the differential housing of the tractor, a generator included in said unit, a countershaft arranged transversely with respect to the longitudinal axis of the tractor and rotatably mounted in said frame, a driven shaft forming a driving connection between said power take-off shaft and said countershaft, one end of said countershaft projecting beyond the frame, a driving connection between said countershaft and said generator at the opposite end of the countershaft, said driving connection being effective to drive the generator in one direction only, and means for rendering the driving connection between the power take-off shaft and the countershaft effective or ineffective.

EARL B. MALOON.